United States Patent
Hase

(10) Patent No.: US 12,314,087 B2
(45) Date of Patent: May 27, 2025

(54) ELECTRONIC DEVICE

(71) Applicant: Panasonic Intellectual Property Management Co., Ltd., Osaka (JP)

(72) Inventor: Kazutoshi Hase, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 363 days.

(21) Appl. No.: 17/940,331

(22) Filed: Sep. 8, 2022

(65) Prior Publication Data
US 2023/0004195 A1 Jan. 5, 2023

Related U.S. Application Data

(63) Continuation of application No. PCT/JP2021/005596, filed on Feb. 16, 2021.

(30) Foreign Application Priority Data

Mar. 23, 2020 (JP) ................. 2020-051159

(51) Int. Cl.
 *G06F 1/16* (2006.01)
(52) U.S. Cl.
 CPC .......... *G06F 1/1677* (2013.01); *G06F 1/1632* (2013.01); *G06F 1/1683* (2013.01)
(58) Field of Classification Search
 CPC ..... G06F 1/1677; G06F 1/1632; G06F 1/1683
 See application file for complete search history.

(56) References Cited

U.S. PATENT DOCUMENTS

| | | | |
|---|---|---|---|
| 5,974,238 A * | 10/1999 | Chase, Jr. | ........... G06F 12/0815 |
| | | | 710/72 |
| 2007/0037619 A1 | 2/2007 | Matsunaga et al. | |
| 2009/0284438 A1 | 11/2009 | Matsunaga et al. | |
| 2012/0276861 A1 | 11/2012 | Isobe et al. | |
| 2013/0331046 A1 | 12/2013 | Hawaka et al. | |

(Continued)

FOREIGN PATENT DOCUMENTS

| | | |
|---|---|---|
| CN | 102759955 A | 10/2012 |
| JP | 2006-340180 A | 12/2006 |
| JP | 2007005848 A | 1/2007 |

(Continued)

OTHER PUBLICATIONS

English Translation of Chinese Office Action dated Apr. 26, 2024 for the related Chinese Patent Application No. 202180019782.1.

(Continued)

*Primary Examiner* — Diane D Mizrahi
(74) *Attorney, Agent, or Firm* — Renner, Otto, Boisselle & Sklar, LLP

(57) ABSTRACT

An electronic device of the present disclosure includes: one or more wireless communication modules that transmit and receive radio waves to and from an external device; an output controller that controls outputs of the one or more wireless communication modules; a state detector that detects a use state of the electronic device; and an identification (ID) identifier that identifies ID information. The output controller controls the outputs of the one or more wireless communication modules based on the use state detected by the state detector and the ID information identified by the ID identifier.

8 Claims, 15 Drawing Sheets

| ID | COUNTRY/AREA | OUTPUT LIMIT |
|---|---|---|
| 01 | JAPAN | STANDARD OUTPUT |
| 02 | NORTH AMERICA (USA, CANADA) | LOW OUTPUT A |
| 03 | EUROPE | STANDARD OUTPUT |
| 04 | KOREA | LOW OUTPUT B |
| 05 | OCEANIA (AUSTRALIA, NEW ZEALAND) | STANDARD OUTPUT |
| 06 | SOUTHEAST ASIA | STANDARD OUTPUT |
| 07 | OTHERS | STANDARD OUTPUT |

(56) References Cited

U.S. PATENT DOCUMENTS

2016/0065690 A1 3/2016 Hanyu et al.
2018/0103436 A1 4/2018 Hawaka et al.

FOREIGN PATENT DOCUMENTS

| | | |
|---|---|---|
| JP | 2009-232437 A | 10/2009 |
| JP | 2012-235184 A | 11/2012 |
| JP | 2013-255156 A | 12/2013 |
| JP | 2015046840 A | 3/2015 |
| JP | 2015-114718 A | 6/2015 |
| JP | 2016-048413 A | 4/2016 |
| JP | 2017-126887 A | 7/2017 |
| JP | 2018-061155 A | 4/2018 |

OTHER PUBLICATIONS

International Search Report for related Application No. PCT/JP2021/005596, mailed May 11, 2021.
English Translation of Chinese Office Action dated Dec. 7, 2023 for the related Chinese Patent Application No. 202180019782.1.

\* cited by examiner

FIG. 5

| ID | COUNTRY/AREA | OUTPUT LIMIT |
|----|--------------|--------------|
| 01 | JAPAN | STANDARD OUTPUT |
| 02 | NORTH AMERICA (USA, CANADA) | LOW OUTPUT A |
| 03 | EUROPE | STANDARD OUTPUT |
| 04 | KOREA | LOW OUTPUT B |
| 05 | OCEANIA (AUSTRALIA, NEW ZEALAND) | STANDARD OUTPUT |
| 06 | SOUTHEAST ASIA | STANDARD OUTPUT |
| 07 | OTHERS | STANDARD OUTPUT |

FIG. 15

| ID | COUNTRY/AREA | WIRELESS LAN OUTPUT CONTROL | WIRELESS WAN OUTPUT CONTROL |
|---|---|---|---|
| 01 | JAPAN | STANDARD OUTPUT | LOW OUTPUT a |
| 02 | NORTH AMERICA (USA, CANADA) | LOW OUTPUT A | LOW OUTPUT b |
| 03 | EUROPE | STANDARD OUTPUT | LOW OUTPUT b |
| 04 | KOREA | LOW OUTPUT B | LOW OUTPUT d |
| 05 | OCEANIA (AUSTRALIA, NEW ZEALAND) | STANDARD OUTPUT | LOW OUTPUT e |
| 06 | SOUTHEAST ASIA | STANDARD OUTPUT | LOW OUTPUT f |
| 07 | OTHERS | STANDARD OUTPUT | STANDARD OUTPUT |

FIG. 16

| OPENING ANGLE | OUTPUT LIMIT |
|---|---|
| 0° TO 15° | LOW OUTPUT 1 |
| 15° TO 60° | LOW OUTPUT 2 |
| 60° TO 120° | LOW OUTPUT 3 |
| 120° TO 180° | LOW OUTPUT 4 |
| 180° TO 360° | STANDARD OUTPUT |

ELECTRONIC DEVICE

BACKGROUND

1. Technical Field

The present disclosure relates to an electronic device.

2. Description of the Related Art

An electronic device such as a tablet personal computer (PC) or a smartphone is equipped with a wireless communication module such as a wireless wide area network (WAN) and a wireless local area network (LAN). There is a concern about the effect of electromagnetic waves radiated by the antenna of the wireless communication module on a living body. Therefore, relevant organizations in various countries have established a specific absorption rate (SAR), which is an amount of energy absorbed in a tissue of a unit mass in a unit time when a human body is exposed to electromagnetic waves.

For example, Patent Literature (PTL) 1 discloses an electronic device that includes a proximity sensor, and reduces the output of a wireless communication module when approaching a human body.

PTL 1 is Unexamined Japanese Patent Publication No. 2013-255156.

SUMMARY

There is still room for improvement in the electronic device of PTL 1 in that the output of the wireless communication module is controlled efficiently.

It is therefore an object of the present disclosure to provide an electronic device capable of efficiently controlling the output of a wireless communication module.

The electronic device of the present disclosure includes: one or more wireless communication modules that transmit and receive radio waves to and from an external device; an output controller that controls outputs of the one or more wireless communication modules; a state detector that detects a use state of the electronic device; and an identification (ID) identifier that identifies ID information. The output controller controls the outputs of the one or more wireless communication modules based on the use state detected by the state detector and the ID information identified by the ID identifier.

According to the present disclosure, it is possible to provide an electronic device capable of efficiently controlling an output of a wireless communication module.

BRIEF DESCRIPTION OF THE DRAWINGS

FIG. 5 is a table illustrating an output of a wireless communication module of the electronic device in FIG. 1.

FIG. 15 is a table illustrating outputs of wireless communication modules for each country in FIG. 13.

FIG. 16 is a table illustrating an output of the wireless communication module in accordance with an opening angle between the first housing and the second housing of the electronic device in FIG. 8.

DETAILED DESCRIPTION

Background to the Present Disclosure

Figure 1:
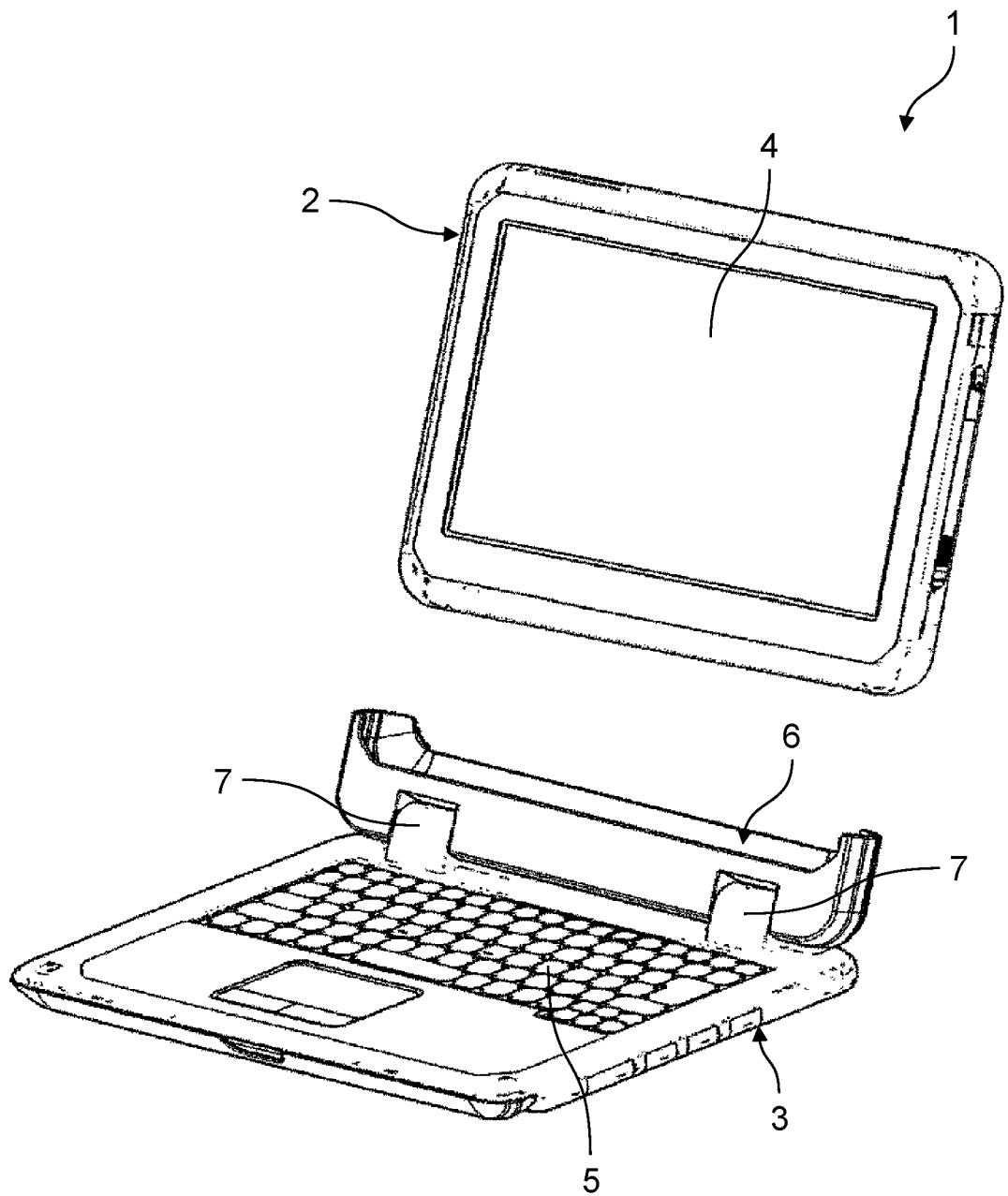
FIG. 1 is a schematic view illustrating an outer appearance of an electronic device according to a first exemplary embodiment.

In an electronic device equipped with a wireless communication module such as a wireless LAN or a wireless WAN, an allowable specific absorption rate (SAR) of an electromagnetic wave radiated by antenna $21a$ is determined for each country. The SAR refers to the amount of electromagnetic wave energy absorbed per unit time in the unit mass of a human body.

For example, in North America (US, Canada) or Korea, the SAR for local exposure of a human body is regulated to be less than or equal to 1.6 W/kg for the average of 1 g of living tissue. In Europe, Ocean countries, Japan, or the like, the SAR is specified to be less than or equal to 2.0 W/kg for the average of 10 g of living tissue.

For example, an electronic device that performs input and output by a touch panel or the like such as a tablet PC tends to have a shorter distance from a human body at the time of use than an electronic device that performs input and output by a keyboard or the like such as a laptop PC. For this reason, particularly in the tablet PC, it is required to reduce the output of the wireless communication module in order to satisfy the SAR regulation.

For example, the electronic device described in PTL 1 uses a proximity sensor to reduce the output of the wireless communication module when the human body and the electronic device are closer than a predetermined distance, thereby satisfying the SAR regulation.

For example, in the case of using the proximity sensor, the output of the wireless communication module is set as low output when the output of the wireless communication module need not be controlled due to erroneous detection or the like, which is problematic in terms of effective control of the output of the wireless communication module.

There has also been studied a method of arranging a plurality of antennas in an electronic device and determining an antenna to be stopped from being used in accordance with the use situation of the electronic device, such as a display direction, a holding direction, or an installation situation. In this case, since a plurality of antennas are mounted on the electronic device, there is a problem that the manufacturing cost increases. In addition, since an unused antenna is generated in accordance with the use situation of the electronic device, there is a problem that space for arranging a plurality of antennas is required in the electronic device to make miniaturization difficult.

Thus, in order to satisfy the SAR regulation, the inventor of the present invention has devised an electronic device configured to efficiently control the output of the wireless communication module and has reached the following invention.

An electronic device according to the present disclosure includes: one or more wireless communication modules that transmit and receive radio waves to and from an external device; an output controller that controls outputs of the one or more wireless communication modules; a state detector that detects a use state of the electronic device; and an ID identifier that identifies ID information.

The output controller controls the outputs of the one or more wireless communication modules based on the use state detected by the state detector and the ID information identified by the ID identifier.

With this configuration, it is possible to provide an electronic device capable of efficiently controlling the output of the wireless communication module.

The ID identifier may identify a country or an area where the electronic device is located.

With this configuration, it is possible to control different wireless communication modules depending on the country or area where the electronic device is located.

The electronic device may further include a position information acquisition unit that acquires position information, and the ID identifier may identify a country or an area where the electronic device is located, based on the position information.

With this configuration, it is possible to control the wireless communication module by identifying a country or an area based on the acquired position information.

The electronic device may further include: a first device including the one or more wireless communication modules, the output controller, the state detector, and the ID identifier; and a second device connected to the first device, and the use state may include a first state where the first device and the second device are not connected and a second state where the first device and the second device are connected.

With this configuration, the output of the wireless communication module can be controlled based on whether or not the first device and the second device are connected.

When the first state is detected by the state detector, the output controller may lower the outputs of the one or more wireless communication modules more than when the second state is detected.

With this configuration, the output of the wireless communication module can be changed between the first state and the second state.

the first device may be a tablet including a display, and the second device may be a main body including an input unit.

With this configuration, in the electronic device in which the tablet is detachable, the output of the wireless communication module can be reduced when the tablet is used alone.

The first device may be a tablet including a display, and the second device may be a car mounter or a cradle connected to the first device.

With this configuration, when the tablet can be connected to the car mounter or the cradle, the output of the wireless communication module can be reduced when the tablet is used alone.

The electronic device may further include: a first housing that includes the one or more wireless communication modules, the output controller, the state detector, the ID identifier, and a display; and a second housing rotatably connected to the first housing via a hinge and having an input unit, and the use state may include a third state where the first housing and the second housing are disposed to face each other and the display is exposed, and a fourth state where the first housing and the second housing are separated from each other in a rotational direction.

With this configuration, in the electronic device usable in the use state of the third state and the fourth state, the output of the wireless communication module can be controlled based on the use state.

The state detector may include a magnetic sensor that detects an opening angle formed by the first housing and the second housing.

With this configuration, the third state and the fourth state can be detected easily.

The output controller may control the outputs of the one or more wireless communication modules based on the opening angle.

With this configuration, the output of the wireless communication module can be more flexibly controlled by the opening angle between the first housing and the second housing.

When the third state is detected by the state detector, the output controller may lower the outputs of the one or more wireless communication modules more than when the fourth state is detected.

With this configuration, when the third state is detected, the output of the wireless communication module can be lowered.

Exemplary embodiments will be described below with reference to the drawings.

First Exemplary Embodiment

Figure 2:
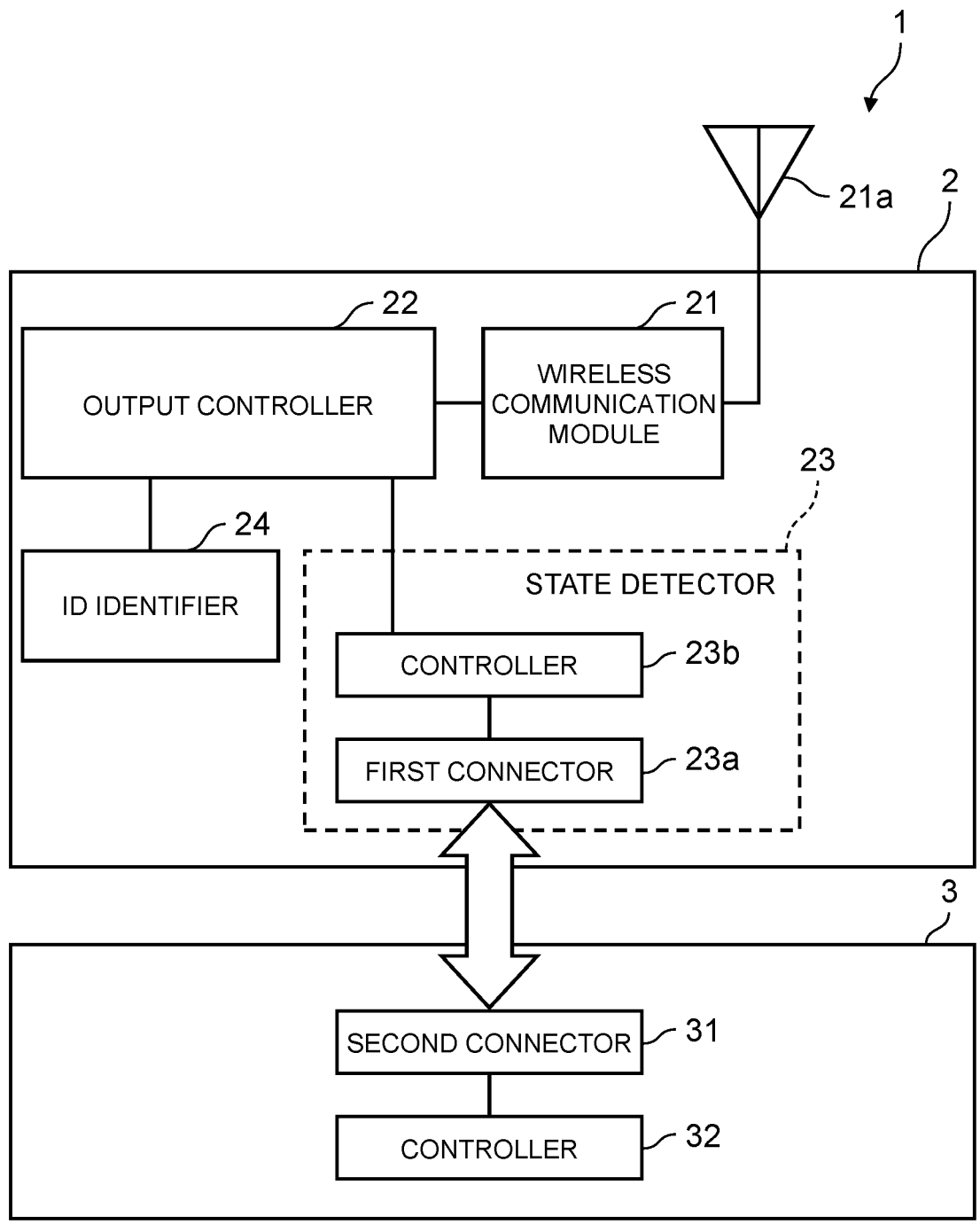
FIG. 2 is a block diagram illustrating an internal configuration of electronic device illustrated in FIG. 1.
Figure 3:
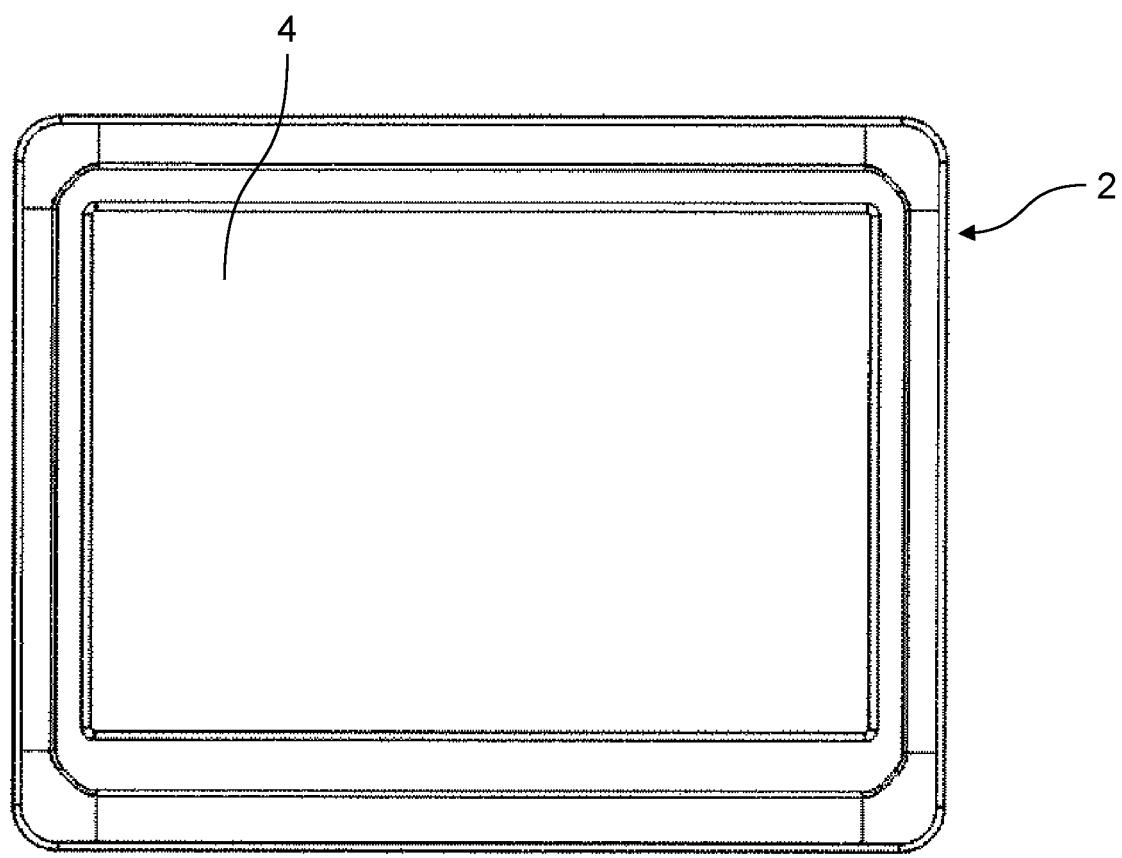
FIG. 3 is a schematic view illustrating a tablet state of the electronic device in FIG. 1.
Figure 4:
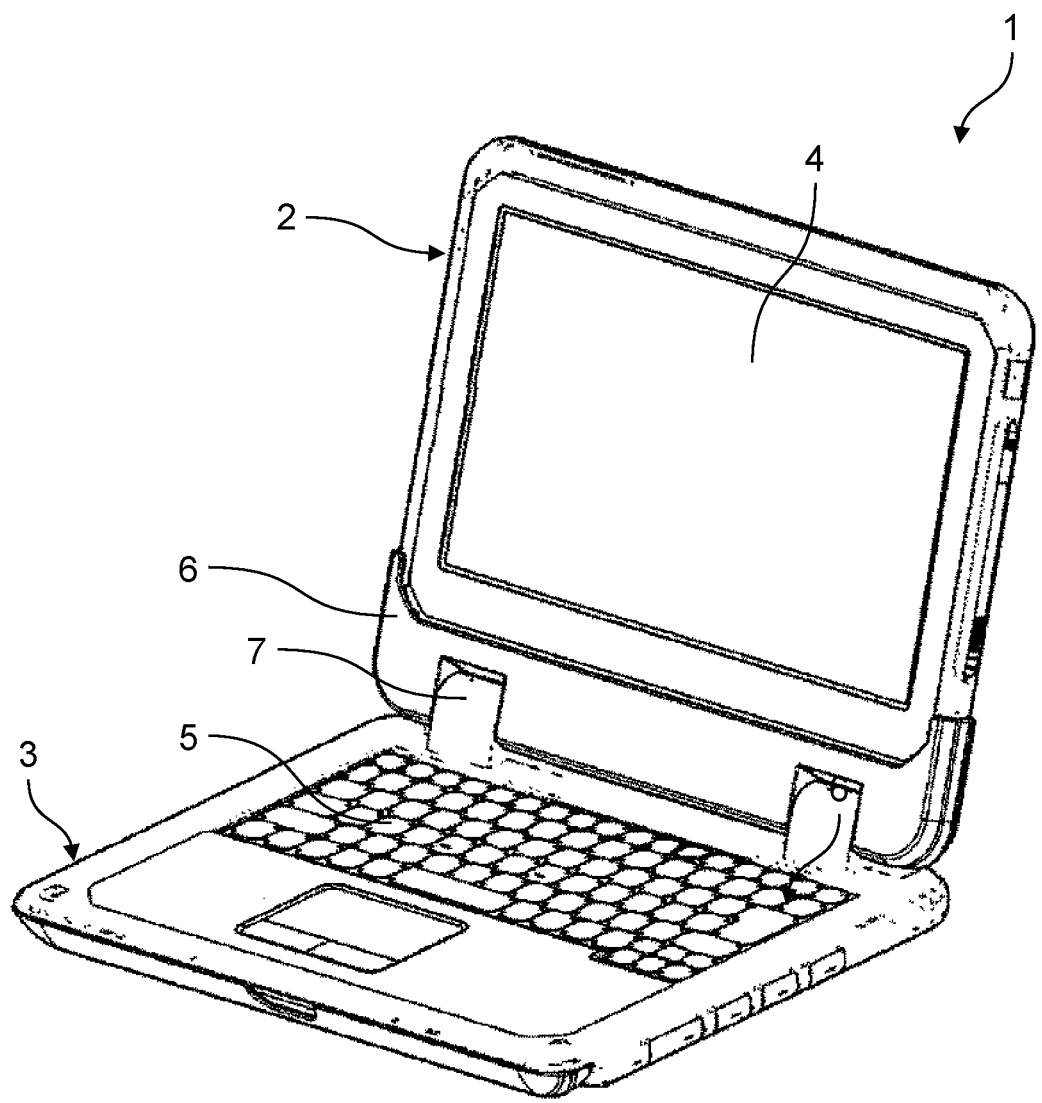
FIG. 4 is a schematic view illustrating a laptop state of the electronic device in FIG. 1.

FIG. 1 is a schematic view illustrating an outer appearance of electronic device 1 of the present disclosure. FIG. 2 is a block diagram illustrating an internal configuration of electronic device 1 illustrated in FIG. 1. FIG. 3 is a schematic view illustrating a tablet state of electronic device 1 in FIG. 1. FIG. 4 is a schematic diagram illustrating a laptop state of electronic device 1 in FIG. 1.

[General Configuration]

As illustrated in FIG. 1, electronic device 1 includes tablet 2 having display 4 and main body 3 having keyboard 5. Tablet 2 and main body 3 are detachably connected. Note that tablet 2 corresponds to a "first device" of the present disclosure, and main body 3 corresponds to a "second device" of the present disclosure. As illustrated in FIG. 2, tablet 2 includes wireless communication module 21, output controller 22, state detector 23, and ID identifier 24. Main body 3 includes second connector 31 and controller 32.

Electronic device 1 can also be used as tablet 2 alone that corresponds to the "first device" of the present disclosure. Electronic device 1 can be used like a laptop PC including keyboard 5 and display 4 by connecting tablet 2 to main body 3 that corresponds to the "second device" of the present disclosure (cf. FIG. 4). That is, electronic device 1 can be used in the tablet state illustrated in FIG. 3 and the laptop state illustrated in FIG. 4.

The tablet state is a state where tablet 2 and main body 3 are not connected to but are separated from each other, and tablet 2 is used alone. Input and output to and from electronic device 1 are performed using a touch panel or the like of display 4. The tablet state corresponds to the "first state" of the present disclosure.

The laptop state is a state where tablet 2 and main body 3 are connected, and tablet 2 and main body 3 are opened. In the laptop state, tablet 2 is inserted into socket 6 of main body 3, whereby connect tablet 2 and main body 3 are connected. In the laptop state, input and output to and from electronic device 1 can be performed using keyboard 5. Keyboard 5 is an example of an input unit. The laptop state corresponds to the "second state" of the present disclosure. Note that a state where tablet 2 is inserted into socket 6 of main body 3, tablet 2 and main body 3 are disposed to face each other, and neither display 4 of tablet 2 nor keyboard 5 of main body 3 is exposed is referred to as a housed state.

When the use state of electronic device 1 is the tablet state, input and output are performed using the touch panel or the like of display 4, so that the distance between electronic device 1 and a human body may be short. Thus, when the use state of electronic device 1 is the tablet state (first state), the output of wireless communication module 21 is preferably reduced in consideration of the SAR regulation. On the other hand, in the laptop state (second state), it is assumed that electronic device 1 is used at a certain distance from the human body, so that the SAR regulation can be satisfied without reducing the output of wireless communication module 21. In addition, the SAR regulation is defined in a state where the electronic device is used, and hence the output of wireless communication module 21 may not be controlled in the housed state.

<Wireless Communication Module>

Wireless communication module 21 transmits and receives radio waves to and from an external device. For example, electronic device 1 can be connected to the Internet or the like by a function such as a wireless LAN or a wireless WAN. Wireless communication module 21 is connected to antenna 21a, and transmits and receives radio waves through antenna 21a. In the present exemplary embodiment, one wireless communication module 21 is connected to one antenna 21a, but the number of antennas and the number of wireless communication modules are not limited thereto.

<Output Controller>

Output controller 22 controls the output of wireless communication module 21. For example, by reducing the output of the wireless communication module in a country with a low SAR regulation value, such as the United States or Canada, the SAR can be controlled to be less than or equal to a predetermined SAR. Output controller 22 controls the output of wireless communication module 21 based on the use state of electronic device 1 detected by state detector 23 and ID information (country ID) identified by the ID identifier, which will be described later.

Output controller 22 may be configured with, for example, a central processing unit (CPU), a microprocessor unit (MPU), a digital signal processor (DSP), a field-programmable gate array (FPGA), an application specific integrated circuit (ASIC), or the like. A function of output controller 22 may be configured only with hardware or may be implemented by a combination of hardware and software. Output controller 22 reads data and programs stored in a storage region (not illustrated) in output controller 22 and performs various arithmetic processing to implement a predetermined function.

FIG. 5 is a table illustrating the output limit of the wireless communication module of electronic device 1 in FIG. 1. As illustrated in the table of FIG. 5, output controller 22 controls the output of the wireless communication module according to the country in which electronic device 1 is located. In the table of FIG. 5, for a country listed as "low output A" or "low output B" in the column of the output limit, the output of wireless communication module 21 is controlled to the low output. Low output A and low output B indicate that the magnitude of the output of wireless communication module 21 is different depending on the SAR regulation value, but the magnitudes of low output A and low output B may be the same. On the other hand, in the table of FIG. 5, for a country or an area listed as "standard output" in the column of the output limit, the output of wireless communication module 21 is set as the standard output. In the present exemplary embodiment, the standard output means that the output of wireless communication module 21 is not particularly controlled. Note that the value of the output limit of each country or area in FIG. 5 may be changed in accordance with a change in legal regulations or the like. In FIG. 5, for example, when the regulation value of the SAR in Japan is changed to control the output of wireless communication module 21 to the low output, the output limit of Japan in the table of FIG. 5 can be changed from "standard output" to "low output A" or "low output B". As thus described, by maintaining the table of FIG. 5, it is possible to flexibly cope with a change in legal regulations in each country or area.

<State Detector>

State detector 23 detects the use state of electronic device 1. In the present exemplary embodiment, state detector 23 includes first connector 23a and controller 23b.

First connector 23a is, for example, a connecting terminal disposed on tablet 2. Second connector 31 is disposed on main body 3, and tablet 2 and main body 3 are electrically connected by connecting first connector 23a and second connector 31.

Controller 23b determines the use state of electronic device 1 based on whether or not first connector 23a and second connector 31 are connected. Controller 23b may be configured with, for example, a CPU, an MPU, a DSP, an FPGA, an ASIC, or the like. A function of controller 23b may be configured only with hardware or may be implemented by a combination of hardware and software. Controller 23b reads data and programs stored in a storage region (not illustrated) in controller 23b and performs various arithmetic processing to implement a predetermined function.

For example, when first connector 23a and second connector 31 are connected, controller 32 of main body 3 has a role of notifying controller 23b of tablet 2 of the input content from keyboard 5 of main body 3. Controller 32 of main body 3 has the same configuration as controller 23b of tablet 2.

Controller 23b of state detector 23 detects the use state of electronic device 1 based on whether or not first connector 23a and second connector 31 are connected electrically. For example, when first connector 23a and second connector 31 are not connected, state detector 23 detects that electronic device 1 is in the first state. When first connector 23a and second connector 31 are connected, state detector 23 detects that electronic device 1 is in the second state.

<ID Identifier>

ID identifier 24 identifies ID information. In the present exemplary embodiment, ID identifier 24 identifies a country ID indicating a country or an area where electronic device 1 is located. That is, in the present exemplary embodiment, the country ID corresponds to "ID information" of the present disclosure. The country ID can be stored in, for example, a storage device (not illustrated) included in electronic device 1. The initial value of the country ID can be set in advance in accordance with the destination of electronic device 1, for example.

ID identifier 24 can identify a country ID set in electronic device 1 and specify a country or an area where electronic device 1 is located. Output controller 22 controls the output of wireless communication module 21 based on the information of the country or area identified by ID identifier 24.

[Operation]

Figure 6:
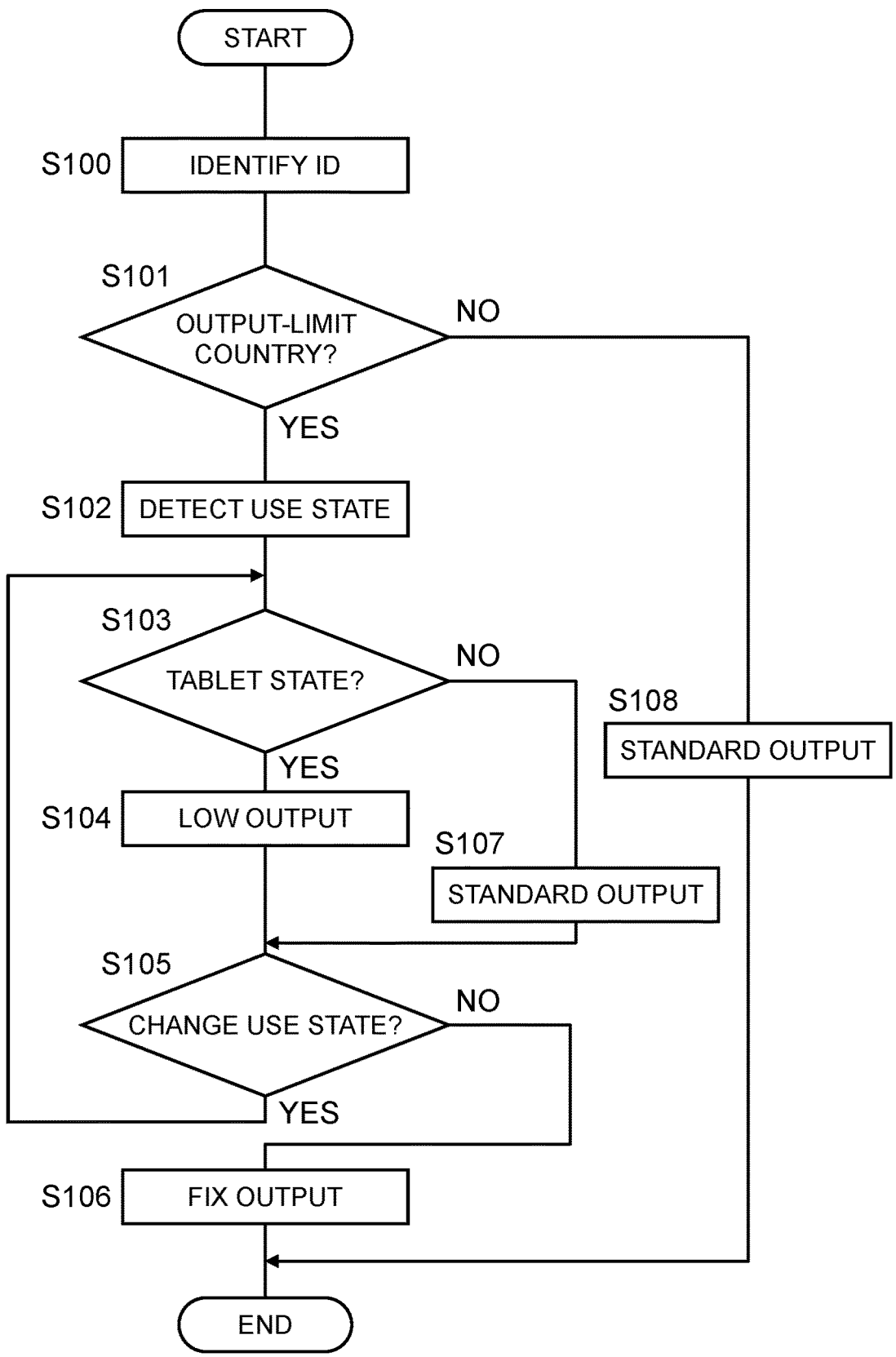
FIG. 6 is a flowchart illustrating the output control of the wireless communication module in the electronic device of FIG. 1.

The operation of the output control of wireless communication module 21 in electronic device 1 will be described with reference to FIGS. 5 and 6. FIG. 6 is a flowchart illustrating the output control of the wireless communication module in electronic device 1 in FIG. 1.

When electronic device 1 is activated, ID identifier 24 identifies a country ID set in electronic device 1 (step S100). Based on the country ID identified by ID identifier 24, output controller 22 determines whether or not the country is an output-limit country (step S101). The determination as to whether or not the country is an output-limit country is performed based on the table illustrated in the table of FIG. 5. The table of FIG. 5 can be stored in, for example, a storage region in output controller 22.

For example, in the present exemplary embodiment, when the country identified by ID identifier 24 is North America or South Korea, there is an output limit, and hence Yes is selected in step S101. On the other hand, when the country identified by ID identifier 24 is a country except for North America or Korea, there is no output limit, and hence No is selected in step S101. When there is no output limit, the processing proceeds to step S108, and output controller 22 sets the output of wireless communication module 21 as the standard output.

When the country identified by ID identifier 24 is a country with an output limit, the use state of electronic device 1 is detected by state detector 23 (step S102). Output controller 22 determines whether or not the use state detected by state detector 23 is the tablet state (step S103). When determining that the state is not the tablet state (No in step S103), output controller 22 sets the output of wireless communication module 21 as the standard output (step S107). When determining that the state is the tablet state (Yes in step S103), output controller 22 sets the output of wireless communication module 21 as the low output (step S104).

The output of wireless communication module 21 being the low output means that the output of wireless communication module 21 is lowered by output controller 22. When the tablet state (first state) is detected by state detector 23, output controller 22 lowers the output of wireless communication module 21 more than when the laptop state (second state) is detected.

For example, when the country identified by ID identifier 24 is North America and the use state is the tablet state, output controller 22 reduces the output of wireless communication module 21 from the standard output so as to satisfy 1.6 W/kg (1 g average), which is the SAR regulation value in North America. The magnitude of the output of wireless communication module 21 may be set not only to two types of the standard output and low output, but also to different values in accordance with the SAR regulation value of each country.

Subsequently, state detector 23 determines whether or not the use state of electronic device 1 has been changed (step S105). When the use state of electronic device 1 has been changed (Yes in step S105), the processing returns to step S103. When the use state of electronic device 1 has not been changed (No in step S105), output controller 22 fixes the output of wireless communication module 21 (step S106). When the power of electronic device 1 is turned off, the processing ends.

(Modifications)

Figure 7:
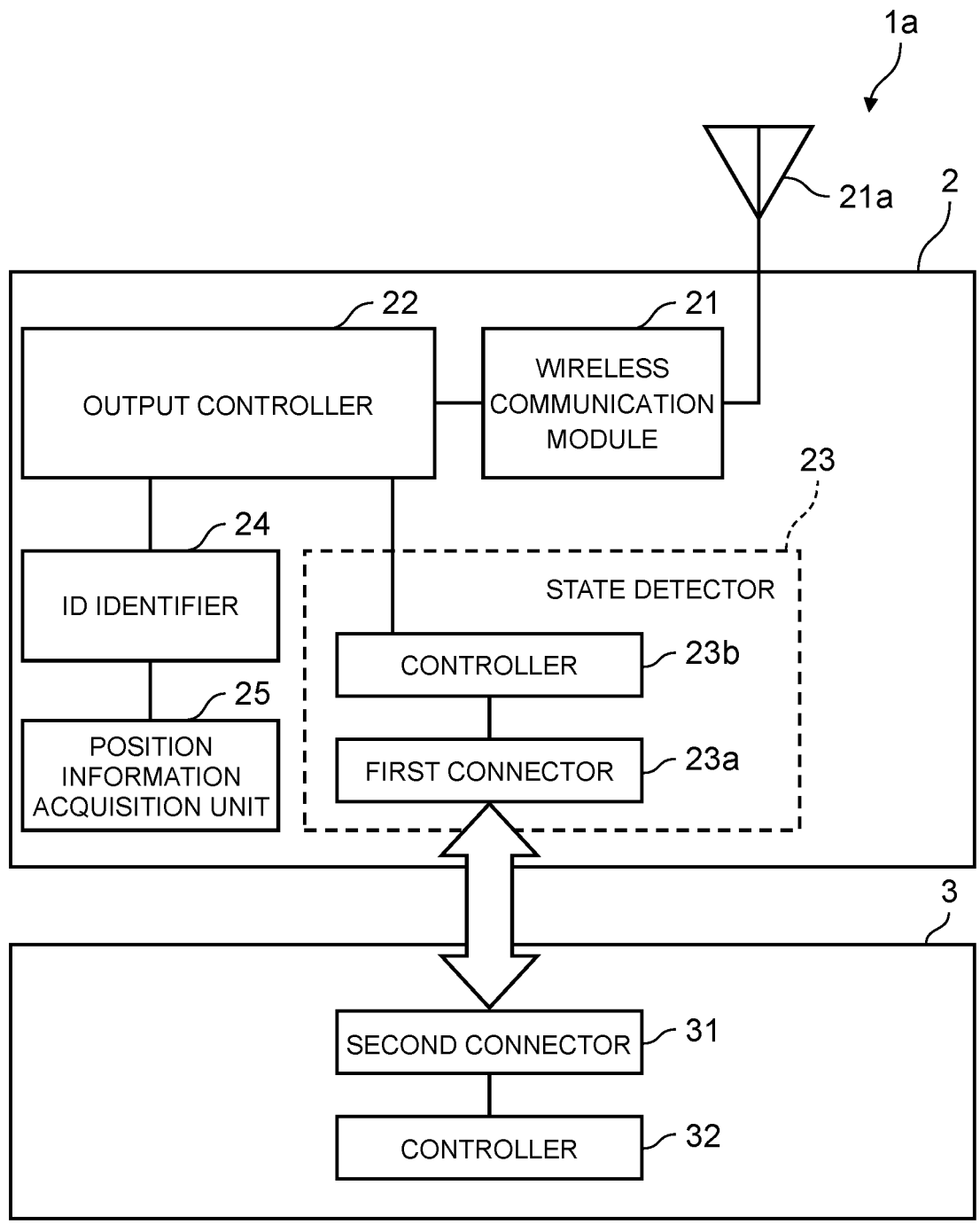
FIG. 7 is a block diagram illustrating a modification of the internal configuration of the electronic device in FIG. 1.

FIG. 7 is a block diagram illustrating electronic device 1a according to a modification of the first exemplary embodiment. As illustrated in FIG. 7, electronic device 1a may include position information acquisition unit 25 that acquires position information. For example, position information acquisition unit 25 can receive a global positioning system (GPS) signal to specify a country or an area where electronic device 1a is located. Alternatively, position information of a wireless access point may be acquired, and a country or an area where electronic device 1a is located may be identified based on the position information.

In electronic device 1a, the country ID is updated based on the position information acquired by position information acquisition unit 25. ID identifier 24 can identify the country or area where electronic device 1a is located based on the updated country ID.

In this case, when electronic device 1a is used in a country or an area except for a country or an area indicated by a preset country ID, the country ID is updated automatically. Therefore, for example, in the case of movement from a country or an area set to "standard output" to a country or an area set to "low output A" or "low output B" in the table of FIG. 5, or vice versa, the country ID may not be updated manually. Therefore, even when electronic device 1a is used across countries or areas with different output limits, output controller 22 can appropriately control the output of the wireless communication module based on the country ID and the use state.

[Effects]

According to the exemplary embodiment described above, it is possible to provide an electronic device capable of efficiently controlling the output of the wireless communication module.

State detector 23 detects the use state of electronic device 1, whereby the output of wireless communication module 21 can be controlled based on the use state. For example, in the case of a tablet state where the distance between electronic device 1 and the human body may be short, the output of wireless communication module 21 can be reduced.

Since the output of wireless communication module 21 is controlled based on the use state, a component such as a proximity sensor may not be used. By controlling the output of wireless communication module 21 without using the proximity sensor or the like, it is possible to provide an electronic device that satisfies the SAR regulation without using a costly component.

Since the proximity sensor or the like is not used, the number of components is reduced to facilitate the downsizing of electronic device 1.

The information identified by ID identifier 24 is not limited to the country ID and may be any identification ID for controlling the output of wireless communication module 21.

In the above exemplary embodiment, electronic device 1 in which tablet 2 and main body 3 are detachable has been described, but the electronic device is not limited to the detachable configuration.

In the exemplary embodiment described above, the configuration in which one antenna 21a is connected to wireless communication module 21 has been described, but a plurality of antennas may be connected to wireless communication module 21. Antenna 21a of wireless communication module 21 may be capable of receiving a GPS signal.

In the exemplary embodiment described above, the configuration in which output controller 22 controls the output of wireless communication module 21 to the standard output or the low output has been described. However, for example, when wireless communication module 21 is set to the low output, the output value may be changed in accordance with the regulation value for each country.

In the exemplary embodiment described above, the configuration has been described in which state detector 23 determines the use state of electronic device 1 based on whether or not first connector 23a and second connector 31 are electrically connected, but the configuration of state detector 23 is not limited thereto. For example, state detector 23 may determine whether or not first connector 23a and second connector 31 are physically connected by, for example, a switch or the like.

Moreover, in the exemplary embodiment described above, the configuration in which electronic device 1, 1a connects tablet 2 and main body 3 has been described, but for example, electronic device 1, 1a can be used in a car mounter state and a cradle state. The car mounter state is a state where tablet 2 is connected to a car mounter that is a peripheral device to be mounted on an automobile. The cradle state is a state where tablet 2 is connected to a cradle that is a peripheral device for charging or using as a table. The car mounter and the cradle correspond to the "second device" of the present disclosure, and the car mounter state and the cradle state correspond to the "second state" of the present disclosure.

Second Exemplary Embodiment

A second exemplary embodiment will be described with reference to FIGS. 8 to 11. In the second exemplary embodiment, the same or equivalent configurations as those in the first exemplary embodiment are denoted by the same reference numerals as those in the first exemplary embodiment. The description already given for the first exemplary embodiment is omitted for the second exemplary embodiment.

Figure 8:
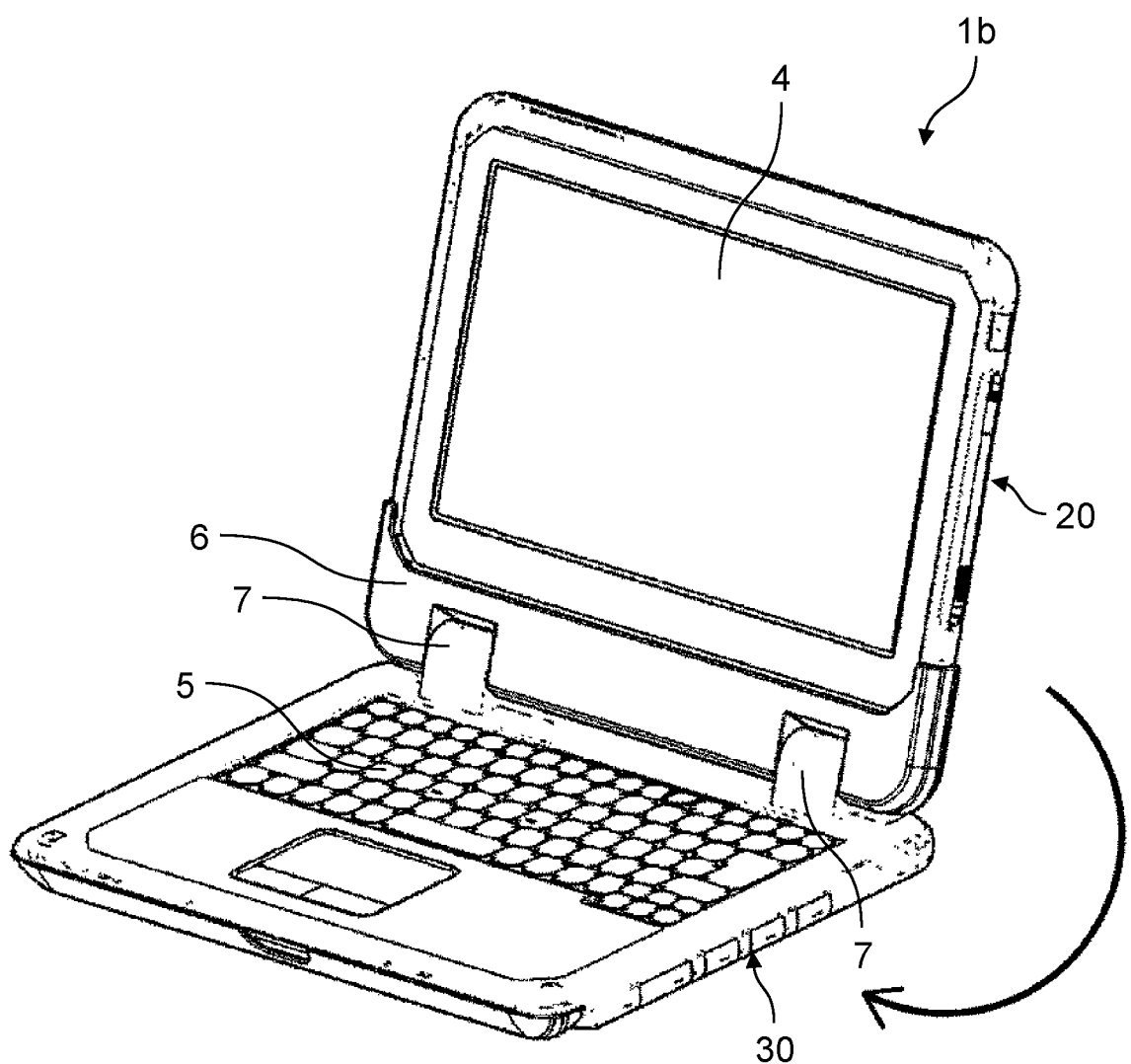
FIG. 8 is a schematic view illustrating an outer appearance of an electronic device according to a second exemplary embodiment.
Figure 9:
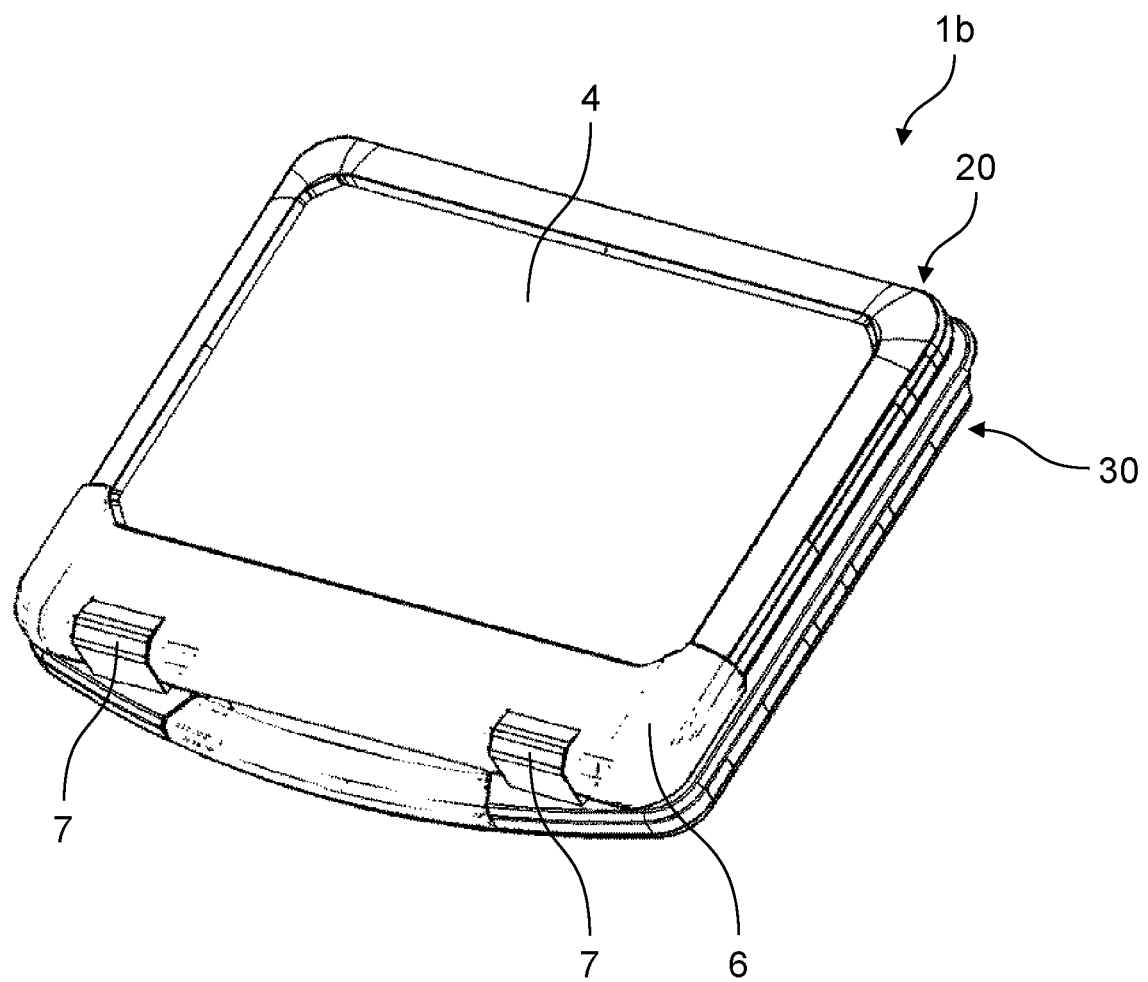
FIG. 9 is a schematic diagram illustrating a convertible state of the electronic device in FIG. 8.
Figure 10:
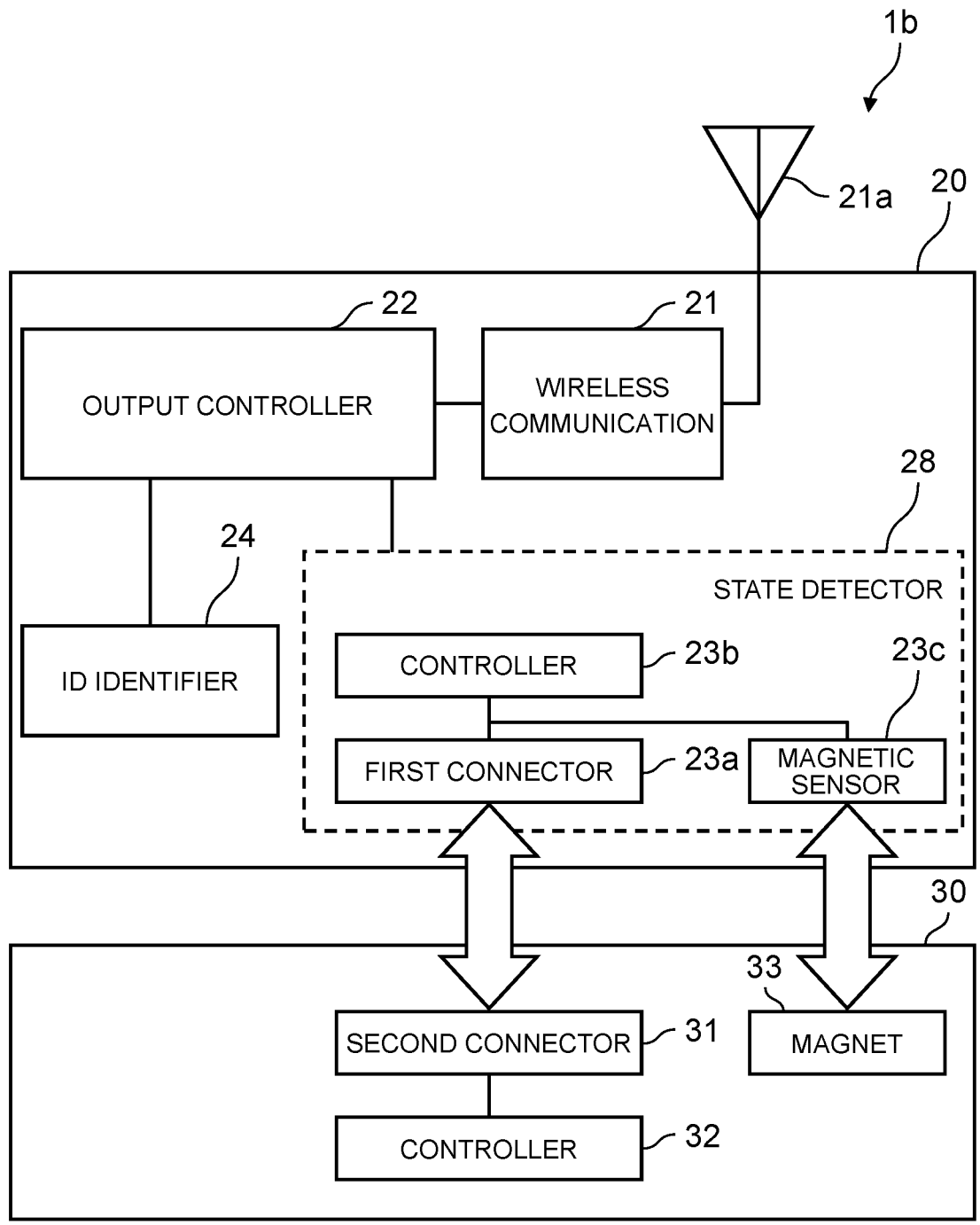
FIG. 10 is a block diagram illustrating an internal configuration of the electronic device in FIG. 8.

FIG. 8 is a schematic view illustrating an outer appearance of electronic device 1b according to the second exemplary embodiment. FIG. 9 is a schematic diagram illustrating a convertible state of electronic device 1b in FIG. 8. FIG. 10 is a block diagram illustrating an internal configuration of electronic device 1b illustrated in FIG. 8.

As illustrated in FIGS. 8 to 10, the second exemplary embodiment is different from the first exemplary embodiment in that electronic device 1b includes first housing 20 and second housing 30 rotatably connected to first housing 20 via hinge 7, state detector 28 of first housing 20 includes magnetic sensor 23c, and second housing 30 includes magnet 33.

In the present exemplary embodiment, state detector 28 includes magnetic sensor 23c that detects an opening angle formed by first housing 20 and second housing 30. Specifically, as illustrated in FIG. 10, state detector 28 includes magnetic sensor 23c electrically connected to controller 23b. Magnet 33 is disposed in second housing 30. The opening angle between first housing 20 and second housing 30 can be detected by magnetic sensor 23c and magnet 33. In state detector 23, magnetic sensor 23c detects the direction of the magnetic flux of magnet 33, and controller 23b determines the opening angle between first housing 20 and second housing 30 based on the direction of the magnetic flux detected by magnetic sensor 23c. The opening angle is an angle formed by first housing 20 and second housing 30 rotatably connected via hinge 7.

As illustrated in FIG. 8, when first housing 20 and second housing 30 are separated from each other in the rotational direction, that is, when first housing 20 and second housing 30 are opened, state detector 23 determines that the use state of electronic device 1b is the laptop state. In the present exemplary embodiment, first housing 20 can be rotated in a direction of an arrow (a direction in which display 4 and keyboard 5 move away from each other) from the state in FIG. 8. When first housing 20 is rotated, first housing 20 and second housing 30 are disposed to face each other as illustrated in FIG. 9. As described above, when first housing 20 and second housing 30 are disposed to face each other and display 4 is exposed, state detector 23 determines that the use state of electronic device 1b is the convertible state. In the convertible state, the opening angle between first housing 20 and second housing 30 is 360 degrees. In the convertible state, display 4 and keyboard 5, which is an input unit, are exposed, and the back surface of first housing 20 on the opposite side of display 4 and the back surface of second housing 30 on the opposite side of keyboard 5 are placed on each other.

In the convertible state, as in the tablet state of the first exemplary embodiment, input and output to and from electronic device 1b are performed by the touch panel or the like of display 4. Thus, when the use state of electronic device 1b is the convertible state (third state), the output of wireless communication module 21 is preferably reduced in consideration of the SAR regulation. On the other hand, in the laptop state (fourth state), it is assumed that electronic device 1 is used at a certain distance from the human body, so that the SAR regulation can be satisfied without reducing the output of wireless communication module 21. In the present exemplary embodiment, the convertible state corresponds to the "third state" of the present disclosure, and the laptop state corresponds to the "fourth state" of the present disclosure.

[Operation]

Figure 11:
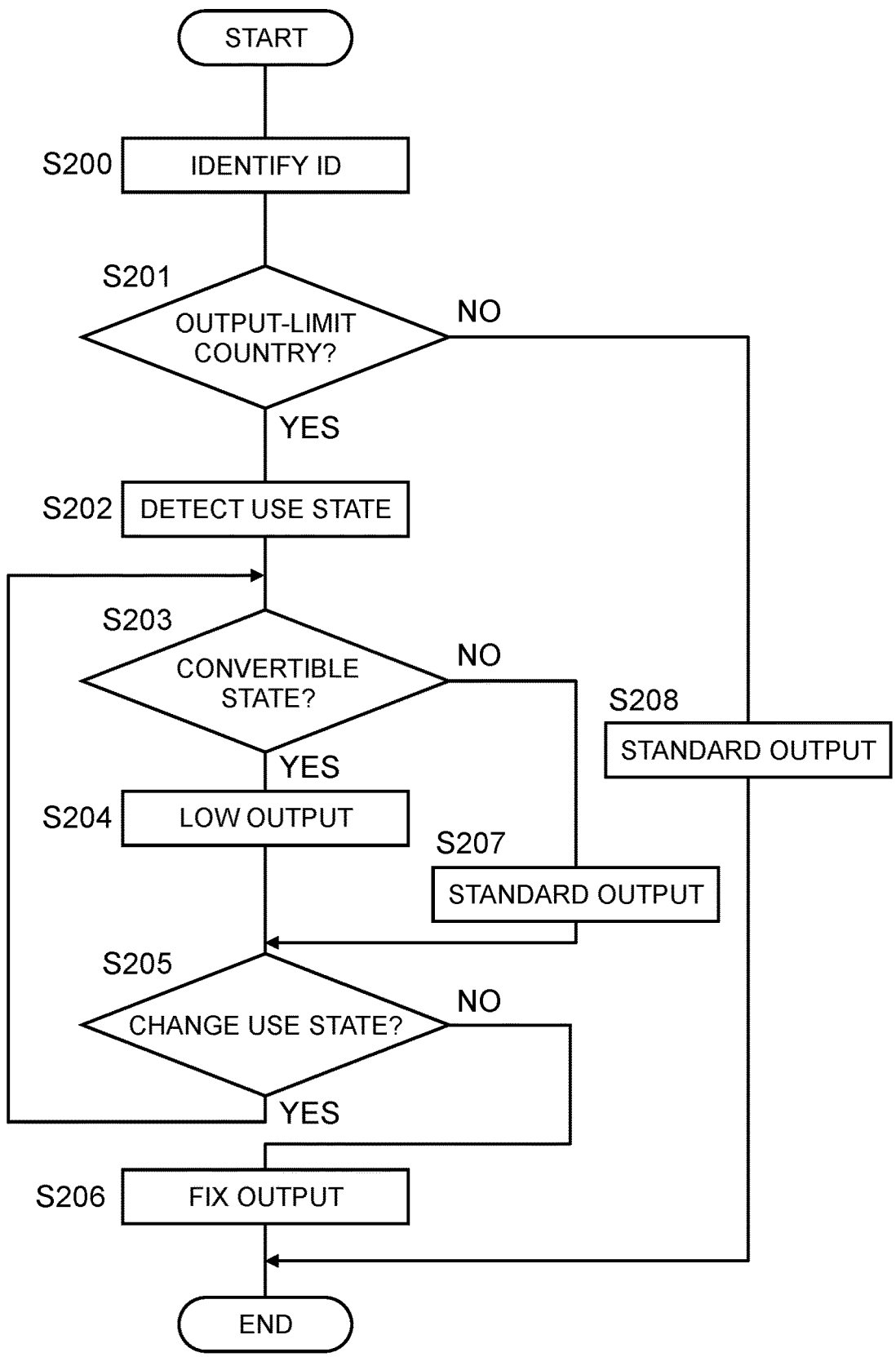
FIG. 11 is a flowchart illustrating the output control of a wireless communication module in the electronic device of FIG. 8.

FIG. 11 is a flowchart illustrating the output control of wireless communication module 21 in electronic device 1b of FIG. 8. The operation of the output control of wireless communication module 21 in the present exemplary embodiment will be described with reference to FIG. 11.

Steps S200 to S202 and steps S204 to S208 in FIG. 11 are the same as steps S100 to S102 and steps S104 to S108 in the first exemplary embodiment, respectively, and hence the description thereof is omitted.

In step S203, state detector 23 determines whether or not the use state of electronic device 1b is the convertible state. When determining that the device is not in the convertible state (No in step S203), output controller 22 sets the output of wireless communication module 21 as the standard output (step S207). When it is determined that the wireless communication module is in the convertible state (Yes in step S203), output controller 22 sets the output of wireless communication module 21 as the low output (step S204).

The output of wireless communication module 21 being the low output means that the output of wireless communication module 21 is lowered by output controller 22. When the convertible state (third state) is detected by state detector 23, output controller 22 lowers the output of wireless communication module 21 more than when the laptop state (fourth state) is detected.

(Modifications)

Figure 12:
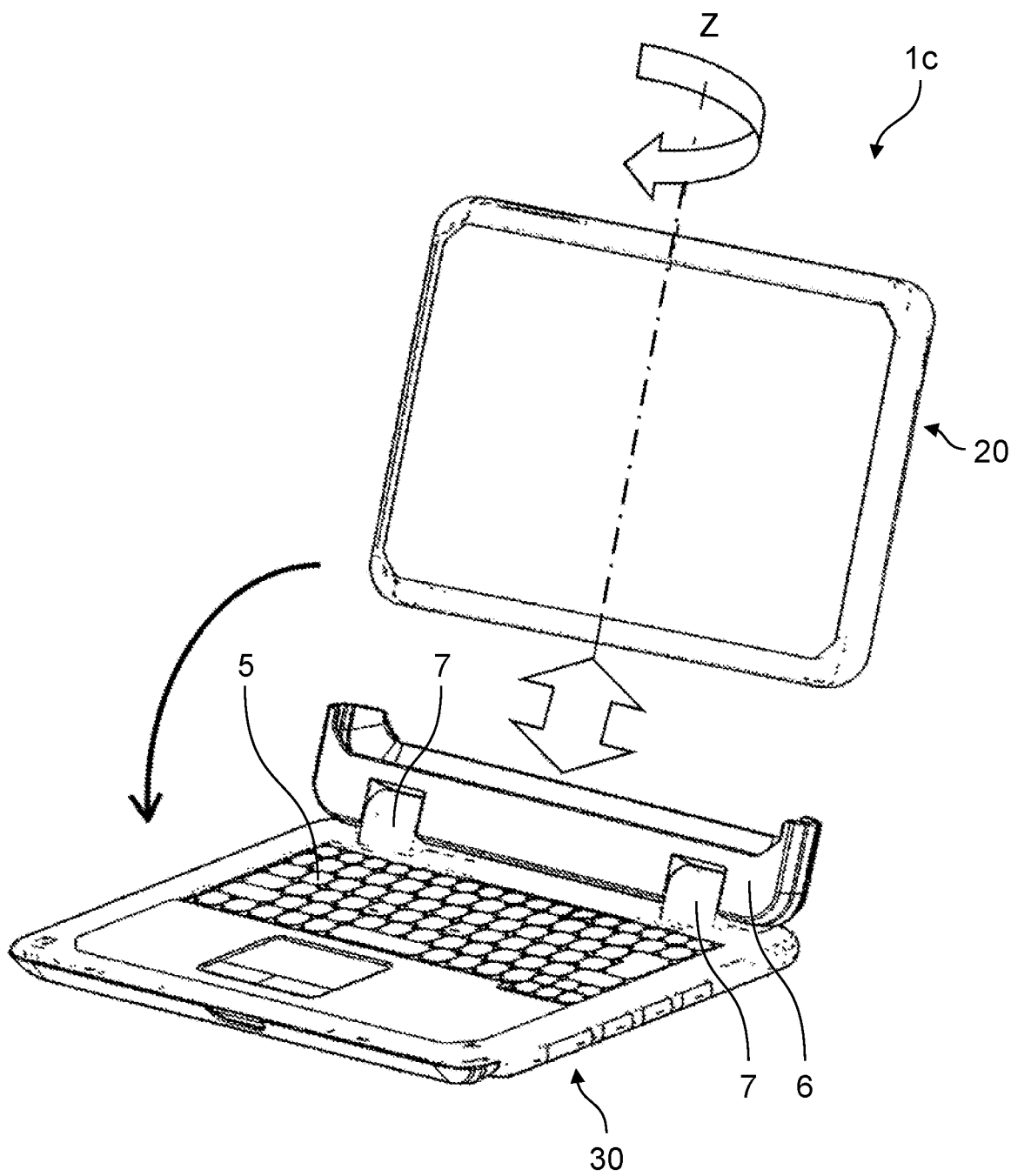
FIG. 12 is a schematic view illustrating an electronic device according to a modification of the second exemplary embodiment.

FIG. 12 is a schematic diagram illustrating electronic device 1c according to a modification of the second exemplary embodiment. As illustrated in FIG. 12, in electronic device 1c, first housing 20 is temporarily detached from second housing 30, and first housing 20 is connected to second housing 30 again in a state where first housing 20 is rotated by 180 degrees about axis Z illustrated in FIG. 12. From this state, first housing 20 and second housing 30 are closed so that first housing 20 covers the keyboard 5 side of second housing 30, whereby electronic device 1c can be brought into the convertible state (third state). At this time, the opening angle between first housing 20 and second housing 30 is 0 degrees. In this case, display 4 is exposed, but keyboard 5 is covered by first housing 20 and is not exposed.

[Effects]

According to the exemplary embodiment described above, in the electronic devices 1b, 1c as well, in which the opening angle between first housing 20 and second housing 30 can be changed by hinge 7, it is possible to reduce the output of wireless communication module 21 in the case of the convertible state (third state).

In the above exemplary embodiment, the configuration has been described in which magnetic sensor 23c is disposed in first housing 20, and magnet 33 is disposed in second housing 30. However, a magnet may be disposed in first housing 20, and a magnetic sensor may be disposed in second housing 30. A plurality of magnetic sensors 23c and a plurality of magnets 33 may be disposed.

In the exemplary embodiment described above, the opening angle between first housing 20 and second housing 30 is detected by magnetic sensor 23c and the magnet 33, but any sensor may be used as long as being capable of detecting the opening angle between first housing 20 and second housing 30, such as an angle sensor, a gyro sensor, or an acceleration sensor.

The first exemplary embodiment and the second exemplary embodiment may be combined or may be used alone.

Third Exemplary Embodiment

A third exemplary embodiment will be described with reference to FIGS. 13 to 15. In the third exemplary embodiment, the same or equivalent configurations as those in the first exemplary embodiment are denoted by the same reference numerals as those in the first exemplary embodiment. The description already given for the first exemplary embodiment is omitted for the third exemplary embodiment.

Figure 13:
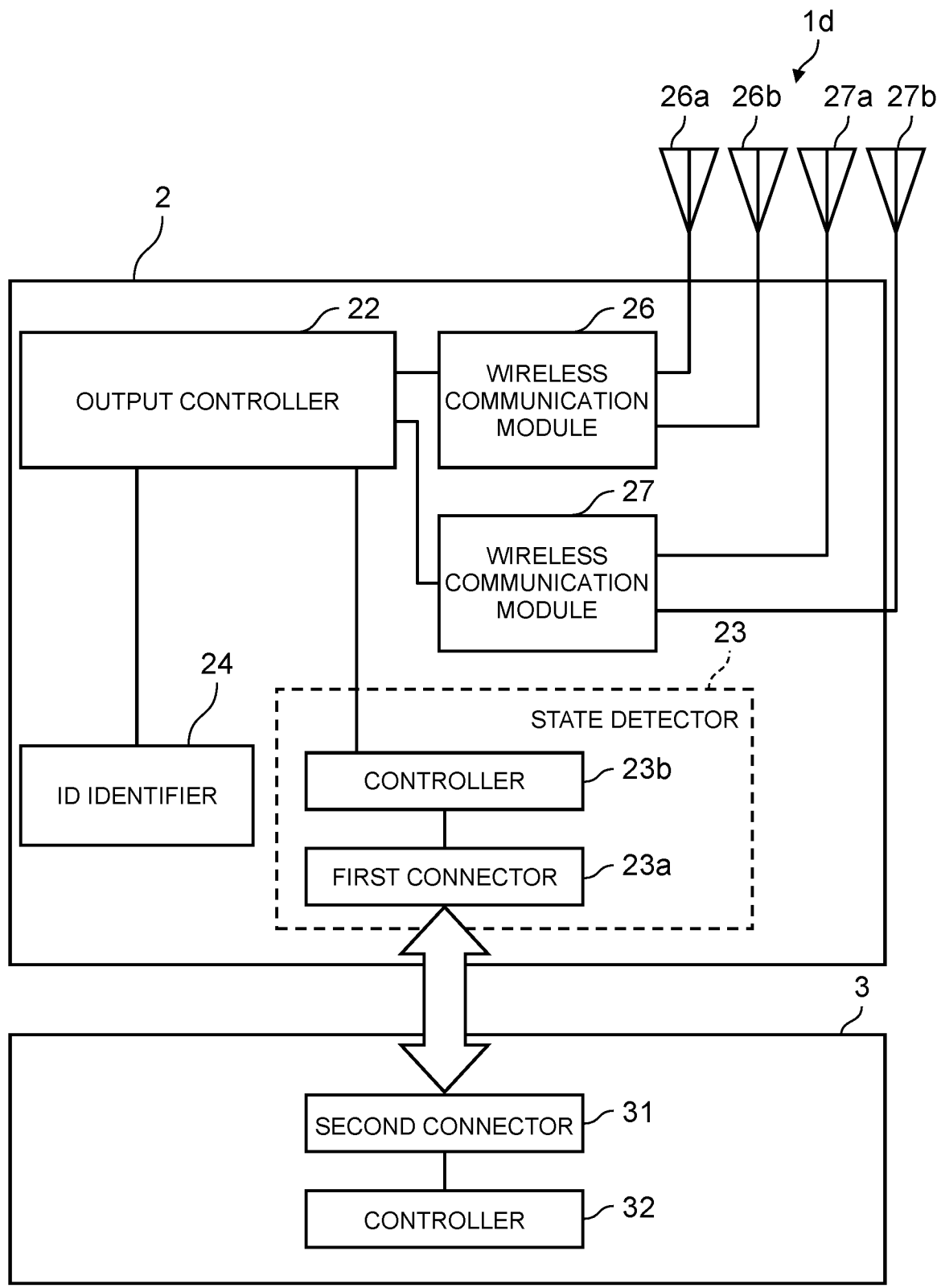
FIG. 13 is a block diagram illustrating an internal configuration of an electronic device according to a third exemplary embodiment of the present disclosure.
Figure 14:
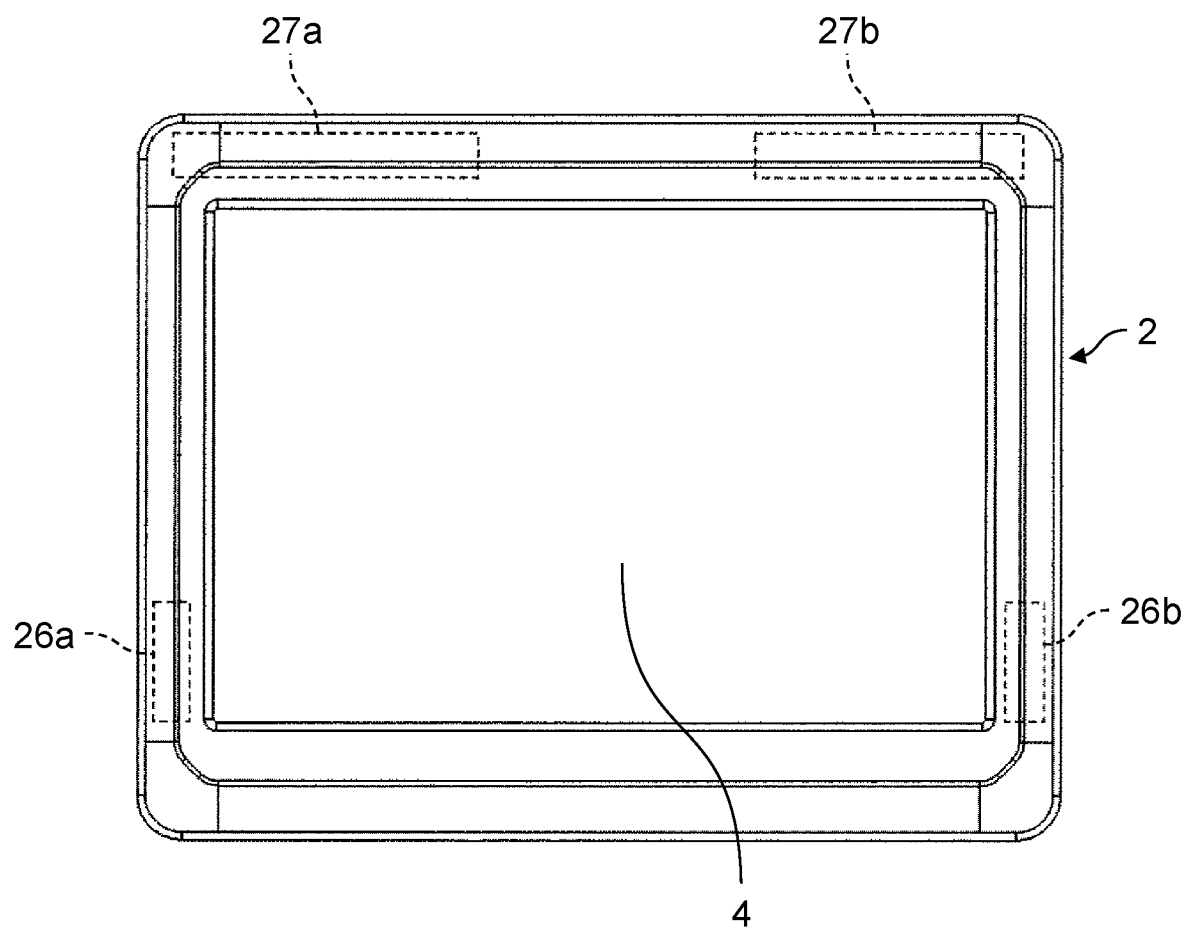
FIG. 14 is a view illustrating an arrangement of antennas of the electronic device in FIG. 13.

FIG. 13 is a block diagram illustrating an internal configuration of electronic device 1d according to the third exemplary embodiment of the present disclosure. FIG. 14 is a view illustrating an arrangement of antennas of electronic device 1d in FIG. 13. FIG. 15 is a table illustrating the outputs of wireless communication modules 26, 27 for each country identified by ID identifier 24 of electronic device 1d in FIG. 13.

As illustrated in FIG. 13, the third exemplary embodiment is different from the first exemplary embodiment in that electronic device 1d includes two wireless communication modules 26, 27. Wireless communication module 26 is connected to the two antennas 26a, 26b, and wireless communication module 27 is connected to the two antennas 27a, 27b. As illustrated in FIG. 14, antennas 26a to 27b are arranged on tablet 2. Note that the arrangement of antennas 26a to 27b in FIG. 14 is an example, and the arrangement positions of antennas 26a to 27b are not limited thereto. In the present exemplary embodiment, wireless communication module 26 is a module for a wireless LAN, and wireless communication module 27 is a module for a wireless WAN.

In the present exemplary embodiment, the outputs of wireless communication module 26 and wireless communication module 27 are controlled for each country ID identified by ID identifier 24. As illustrated in the table of FIG. 15, the output control can be different between wireless communication module 26 (wireless LAN) and wireless communication module 27 (wireless WAN).

For example, in Japan, the SAR regulation value is not exceeded in the case of a wireless LAN, but the SAR regulation value may be exceeded in the case of a wireless WAN. Therefore, as illustrated in the table of FIG. 15, when the country ID identified by ID identifier 24 indicates Japan, output controller 22 controls wireless communication module 27 so as to reduce its output based on the use state of electronic device 1d. On the other hand, output controller 22 does not cause wireless communication module 26 to reduce its output.

[Effects]

According to the exemplary embodiment described above, when there is a possibility that an output of one of the two wireless communication modules 26, 27 exceeds the SAR regulation for each country based on the country identified by ID identifier 24, output controller 22 can reduce the output. Even when electronic device 1d has a plurality of wireless communication modules, it is possible to perform output control without using a component such as a sensor.

In the exemplary embodiment described above, the configuration in which electronic device 1d includes two wireless communication modules has been described, but the number of wireless communication modules may be one or may be more than one.

Fourth Exemplary Embodiment

A fourth exemplary embodiment will be described with reference to FIG. 16. In the fourth exemplary embodiment, the same or equivalent configurations as those in the second exemplary embodiment are denoted by the same reference numerals as those in the second exemplary embodiment. The description already given for the second exemplary embodiment is omitted for the fourth exemplary embodiment.

FIG. 16 is a table illustrating an output of the wireless communication module in accordance with an opening angle between first housing 20 and second housing 30 of electronic device 1 in FIG. 1.

The fourth exemplary embodiment is different from the second exemplary embodiment in that the output of wireless communication module 21 is controlled based on the opening angle formed by first housing 20 and second housing 30. The opening angle is an angle formed by first housing 20 and second housing 30, where an angle formed by first housing 20 and second housing 30 when electronic device 1c in FIG. 12 described in the modification of the second exemplary embodiment is in the convertible state (a state where display 4 is exposed and keyboard 5 is not exposed) is 0 degrees.

In FIG. 16, the output of wireless communication module 21 is the smallest at low output 1 and increases in the order of low output 2, low output 3, low output 4, and the standard output. From the convertible state to the opening angle of 15 degrees, the output of wireless communication module 21 is controlled to be the lowest by output controller 22. When the opening angle is 0 degrees to 180 degrees, the output of wireless communication module 21 is controlled to increase stepwise in accordance with the opening angle. When the opening angle exceeds 180 degrees, wireless communication module 21 is controlled to the standard output. In the convertible state of electronic device 1b illustrated in FIG. 9 of the second exemplary embodiment (the state where both display 4 and keyboard 5 are exposed), the opening angle formed by first housing 20 and second housing 30 is 360 degrees. Therefore, wireless communication module 21 may be controlled to the standard output when the opening angle is 0 degrees to 180 degrees, and the output of wireless communication module 21 may be controlled to decrease as the opening angle increases from 180 degrees to 360 degrees.

State detector 28 detects the opening angle by using magnetic sensor 23c and the like illustrated in FIG. 10 described above.

[Effects]

According to the exemplary embodiment described above, it is possible to more flexibly control the output of wireless communication module 21.

The present disclosure can be widely applied to an electronic device equipped with a wireless communication module.

What is claimed is:

1. An electronic device comprising:
    one or more wireless communication modules that transmit and receive radio waves to and from an external device;
    an output controller that controls outputs of the one or more wireless communication modules;
    a state detector that detects a use state of the electronic device;
    an identification (ID) identifier that identifies ID information; and
    a position information acquisition unit that acquires position information,
    wherein the output controller controls the outputs of the one or more wireless communication modules based on the use state detected by the state detector and the ID information identified by the ID identifier, and
    the ID identifier identifies a country or an area where the electronic device is located, based on the position information.

2. The electronic device according to claim 1, further comprising:
    a first device including the one or more wireless communication modules, the output controller, the state detector, and the ID identifier; and
    a second device connected to the first device,
    wherein the use state includes a first state where the first device and the second device are not connected and a second state where the first device and the second device are connected.

3. The electronic device according to claim 2, wherein when the first state is detected by the state detector, the output controller lowers the outputs of the one or more wireless communication modules more than when the second state is detected.

4. The electronic device according to claim 2, wherein the first device is a tablet including a display, and the second device is a main body including an input unit.

5. The electronic device according to claim 2, wherein the first device is a tablet including a display, and the second device is a car mounter or a cradle connected to the first device.

6. The electronic device according to claim 1, further comprising:
    a first housing that includes the one or more wireless communication modules, the output controller, the state detector, the ID identifier, and a display; and
    a second housing rotatably connected to the first housing via a hinge and having an input unit,
    wherein the use state includes a third state where the first housing and the second housing are disposed to face each other and the display is exposed, and a fourth state where the first housing and the second housing are separated from each other in a rotational direction.

7. The electronic device according to claim 6, wherein the state detector includes a magnetic sensor that detects an opening angle formed by the first housing and the second housing.

8. The electronic device according to claim 7, wherein the output controller controls the outputs of the one or more wireless communication modules based on the opening angle.

* * * * *